April 21, 1959 N. R. WATKIN 2,882,964
DOGHOUSE DOOR OR THE LIKE
Filed Sept. 17, 1956 3 Sheets-Sheet 1

INVENTOR
Nathaniel R. Watkin
BY Roy A. Plant
ATTORNEY

April 21, 1959  N. R. WATKIN  2,882,964
DOGHOUSE DOOR OR THE LIKE
Filed Sept. 17, 1956  3 Sheets-Sheet 2

INVENTOR
Nathaniel R. Watkin

BY Roy A. Plant

ATTORNEY

April 21, 1959   N. R. WATKIN   2,882,964
DOGHOUSE DOOR OR THE LIKE
Filed Sept. 17, 1956   3 Sheets-Sheet 3
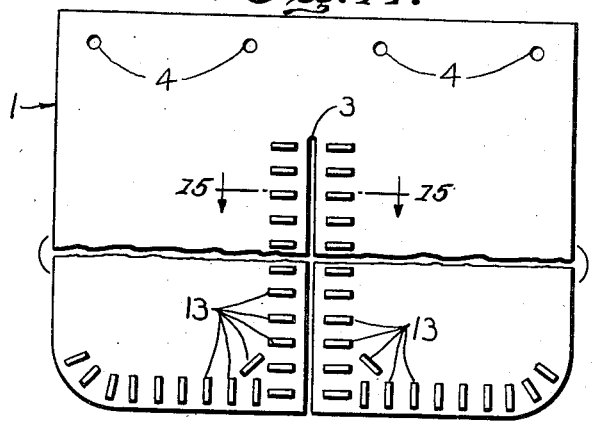
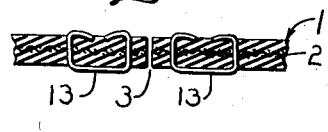
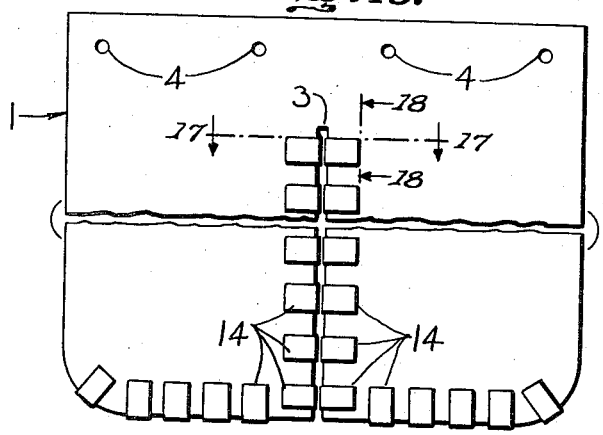
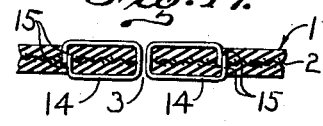
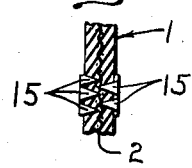
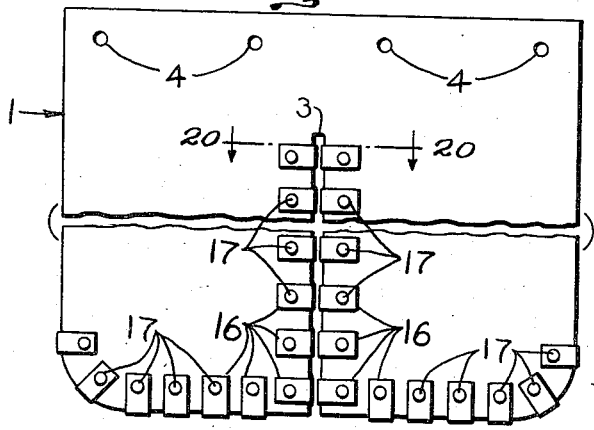
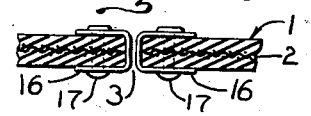
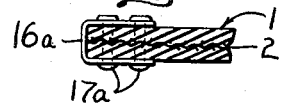
INVENTOR
Nathaniel R. Watkin
BY Roy A. Plant
ATTORNEY

United States Patent Office 2,882,964
Patented Apr. 21, 1959

2,882,964

DOGHOUSE DOOR OR THE LIKE

Nathaniel R. Watkin, Battle Creek, Mich.

Application September 17, 1956, Serial No. 610,345

10 Claims. (Cl. 160—330)

The present invention relates broadly to closure members, and in its more specific phases to a doghouse doorway flap or door assembly.

Kennel operators and dog owners who keep their dogs with access to the outside in all seasons and weather have a great deal of difficulty in keeping flexible door opening covers in effective condition, as such covers are commonly made of scraps of rugs, burlap, rubber inner tubes and the like, and most dogs, particularly the younger, often chew the covers into shreds and/or tear them entirely off, thus depriving themselves of needed protection from the elements in their doghouse. Regardless of this drawback, the pliable cover is the best for the purpose as it presents no hazards to the legs and other parts of the dogs, whereas swinging doors of more or less rigid construction have frequently caused severe injuries, since such a door will act as a trap if a dog starts through the door and then changes his mind and tries to back up. Serious leg, neck and back injuries can be inflicted in this manner and frequently legs are broken. It was a recognition of these shortcomings of the prior doghouse door devices, and a knowledge that there was no doghouse door commercially on the market which would solve this problem in a satisfactory manner, which led to the conception and development of the present invention.

Accordingly among the objects of the present invention is the overcoming of such difficulties by providing a tough pliable sheet to be hung over the door opening of a doghouse, and by providing substantially rigid reinforcing elements spaced apart at close intervals along edges of said sheet, said sheet being sufficiently tough to substantially prevent a dog from injuring it with his teeth, and the reinforcing elements in the edge of same also being tough but of sufficiently soft material to prevent tooth injury if the dog strikes them while chewing upon the pliable sheet. This sheet is preferably made of fabric reinforced rubber or suitable plastic material, which is from one-eighth to one-fourth inch thick; and the spaced reinforcing elements are preferably formed from soft non-ferrous metal, such as brass, and serve to discourage the dog from chewing up the doorway covering.

Another object of this invention is to provide a doghouse door of tough pliable sheet form which is firm enough to resist serious flapping under normal weather conditions, and yet readily allows ingress and egress through a doorway into the doghouse with which it is used.

Another object of this invention is to provide a doghouse door of sheet material in tough pliable form having a narrow slit which is substantially centrally located and extends vertically from the bottom of the door to a point near but short of the top of same so as to provide a double flap assembly to facilitate use as a doghouse door.

A further object is to reinforce the edge portions of a substantially centrally located narrow slit in a doghouse door formed of tough pliable sheet material, said slit forming the point of ingress and egress for the dog into and out of the doghouse.

Still further objects and advantages of the present invention will appear as the description proceeds.

To the accomplishment of the foregoing and related ends, the invention, then, consists of the closure means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 14 is a fragmentary elevational view of another form of door.

Figure 15 is a detail sectional view taken on line 15—15 of Figure 14, looking in the direction of the arrows.

Figure 16 is a fragmentary elevational view of another form of door.

Figure 17 is a detail sectional view taken on line 17—17 of Figure 16, looking in the direction of the arrows.

Figure 18 is a detail sectional view taken on line 18—18 of Figure 16, looking in the direction of the arrows.

Figure 19 is a fragmentary elevational view of still another form of door.

Figure 20 is a detail sectional view taken on line 20—20 of Figure 19, looking in the direction of the arrows.

Figure 21 is a detail sectional view similar to Figure 20 with an additional rivet for the anchoring of an edge protecting clip.

Figure 1:
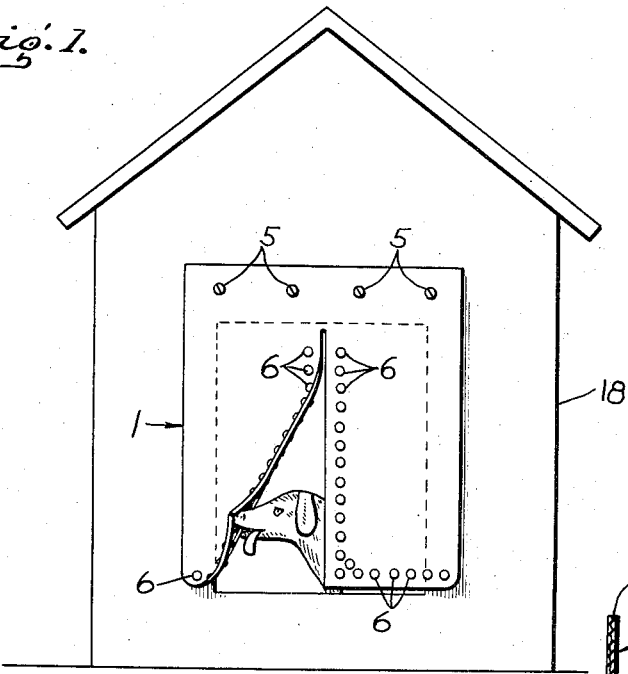
Figure 1 is a front view of a doghouse showing one form of the door installed.

In all forms of the invention disclosed, the tough pliable sheet is denoted at 1. The various kinds of spaced reinforcing elements, however, will be given different reference numerals in each form of construction. However, it may be here stated that all of these reinforcing elements are preferably formed from a relatively soft non-ferrous metal, such as brass, copper or aluminum.

The sheet 1 is preferably rectangular except that its lower corners may be rounded as shown. Such sheet is also preferably formed from tough rubber having one or more plies of reinforcing fabric 2, and has a substantially central slit 3 extending upward from its lower edge to a point near, but spaced downward from, its upper edge. At the upper edge of the sheet there is provided means for fastening same in desired position to a doghouse 18, or the like, such as by means of openings 4 to receive attaching fasteners 5, Figure 1. These fasteners are preferably in the form of screws to allow easy detachment of the door in summer and remounting in winter.

Figure 2:
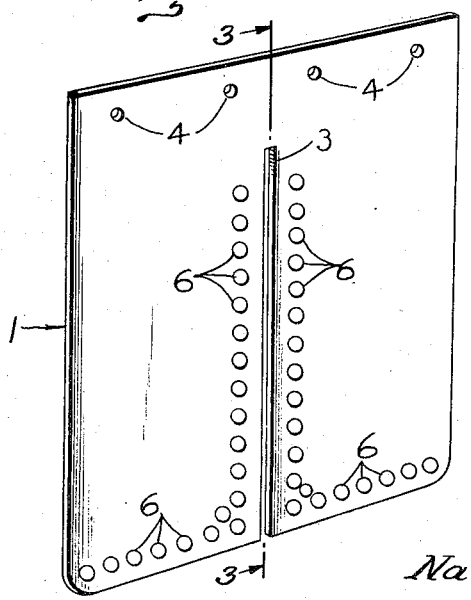
Figure 2 is a perspective view of the door of Figure 1, prior to installation.
Figure 3:
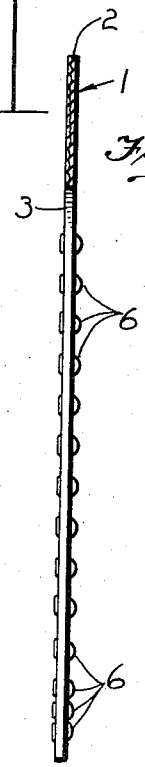
Figure 3 is a vertical sectional view on line 3—3 of Figure 2, looking in the direction of the arrows.

In each form of the invention, the sheet 1 is reinforced along the edges of the slit 3, which is preferably substantially perpendicular to the bottom edge of the sheet, and along the lower edge of said sheet by the spaced reinforcing elements above mentioned. In Figures 1 to 3 these reinforcing elements are shown in the form of rivets 6 passing through the sheet 1, and these rivets may be of any suitable type such as solid form, split form or tubular form. This latter statement is true also of all rivets hereinafter mentioned.

Figure 4:
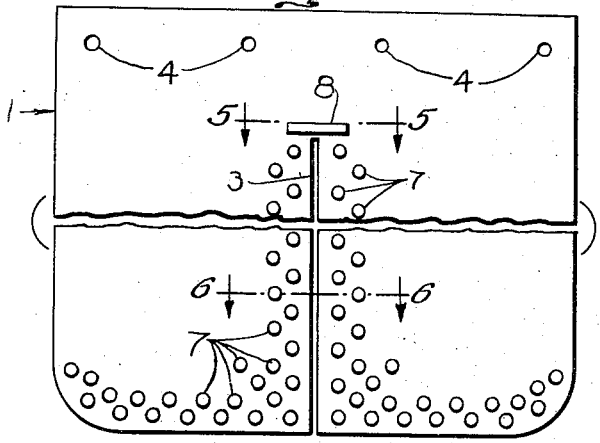
Figure 4 is a fragmentary front elevational view of another form of door.
Figure 5:
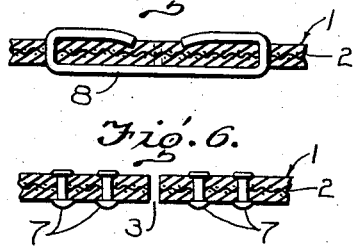
Figure 5 is a detail sectional view taken on line 5—5 of Figure 4, looking in the direction of the arrows.
Figure 6:
Figure 6 is a detail sectional view taken on line 6—6 of Figure 4, looking in the direction of the arrows.
Figure 7:
Figure 7 is a detail sectional view, similar to Figures 5 and 6, showing a different form of rivet set into the fabric of the door.

In Figures 4 to 6, the sheet 1 is provided with a much greater number of rivets 7; and a soft metal stitch 8 is shown over the slit 3 to reinforce same against tearing. The rivets 7 may be considered as either solid or tubular, and the rivet 7a of Figure 7 is of split form.

Figure 8:
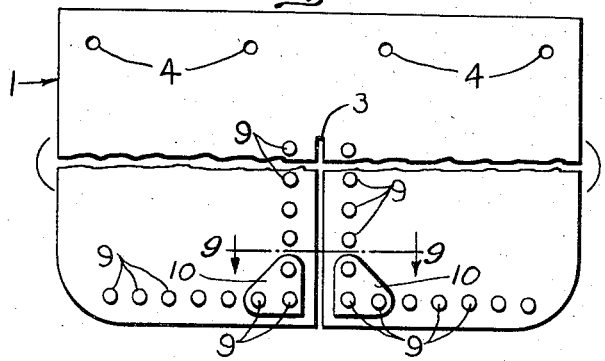
Figure 8 is a fragmentary elevational view of another form of door.
Figure 9:
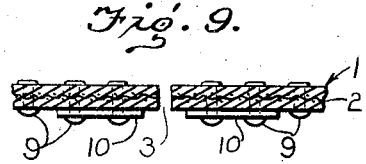
Figure 9 is a detail sectional view taken on line 9—9 of Figure 8, looking in the direction of the arrows.

In Figures 8 and 9, in addition to using rivets 9, two triangular soft metal washer plates 10 are attached to the sheet 1 by some of these rivets, said washer plates being located in the corners between the edges of the slit 3 and the lower edge of the sheet.

Figure 10:
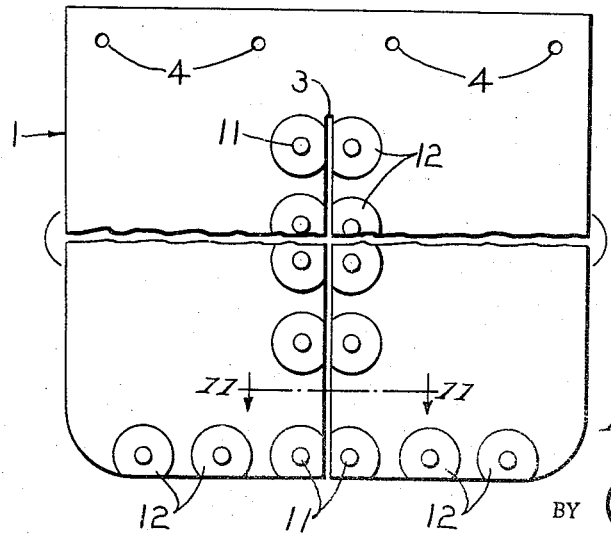
Figure 10 is a fragmentary elevational view of another form of door.
Figure 11:
Figure 11 is a detail sectional view taken on line 11—11 of Figure 10, looking in the direction of the arrows.
Figure 12:
Figures 12 and 13 are detail sectional views, similar to Figure 11, showing different forms of washer plates associated with the rivets.
Figure 13:

In Figures 10 and 11, all of the rivets 11 attach flat soft metal washer plates 12 to the sheet 1. Figure 12 shows a concavo-convex washer 12a secured by one of the rivets with the outer edge of said washer pressed against one side of the sheet; and Figure 13 shows that each rivet may secure two such washers 12b against opposite sides of said sheet.

In Figures 14 and 15, the reinforcing elements are in the form of soft metal stitches 13.

In Figures 16 to 18, U-shaped soft metal clips 14 straddle edges of the sheet 1 and have teeth 15 on the ends of their side arms, said teeth being embedded in said sheet.

In Figures 19 and 20, similar clips 16 are secured by rivets 17, one rivet being used for each clip. In Figure 21, however, a longer clip 16a is shown and two rivets 17a are used.

The different forms of the invention above described are illustrative of a large number of constructions which may be followed. Each has the required advantages for attaining the desired ends in a simple and inexpensive manner; and each provides an effective and durable article which may be expeditiously manufactured and profitably sold at a reasonable price. The directional terms such as "over," "lower," "upper," and "vertical" have been used to facilitate description of the invention and are not to be considered as limiting upon the construction involved.

Other modes of applying the principle of my invention may be employed instead of those explained, change being made as regards the closure member and combinations herein disclosed, provided the means stated by any of the following claims or the equivalent of such stated means be employed.

I therefore particularly point out and distinctly claim as my invention:

1. A doghouse door in the form of a sheet of tough pliable material to be hung over a door opening, means for supporting said sheet over said door opening solely from its upper edge, and a multiplicity of separate, individual, substantially-rigid, small, exposed, reinforcing elements secured to said sheet and spaced apart from each other along movable edges thereof, said reinforcing elements being of different material than said sheet and while relatively hard are sufficiently soft to normally prevent injury to the dog's teeth if he chews upon said reinforced edge portion of said sheet.

2. A doghouse door in the form of a sheet of tough pliable material to be hung over a door opening, means for supporting said sheet solely from its upper edge, said sheet having a pair of edge to edge flaps, said flaps being disconnected from each other throughout their length and freely movable relative to each other due to said sheet having a substantially central vertical slit extending from its lower end to a point at the top of said flaps and which is near but short of the upper end of said sheet, and a multiplicity of separate, individual, substantially rigid, small, exposed, reinforcing elements of a material different from said sheet and secured to said sheet and spaced apart from each other along the edges of said slit as well as along the lower end of said sheet, said reinforcing elements being of a rigid but sufficiently soft material to normally prevent injury to the dog's teeth if he chews upon said reinforced edge portion of said sheet.

3. A doghouse door in the form of a sheet of tough pliable material with means adapting it to be hung from its top edge over a door opening, said sheet having a pair of edge to edge flaps, said flaps being disconnected from each other throughout their length and freely movable relative to each other due to said sheet having a substantially central vertical slit extending from its lower end to a point at the top of said flaps and which is near but short of the upper end of said sheet, and a multiplicity of separate, and individual, substantially rigid, small, exposed, reinforcing elements secured to said sheet and spaced apart from each other along said slit and the bottom edges of said sheet, said reinforcing elements being of a different material than said sheet and sufficiently soft to normally prevent injury to a dog's teeth if he chews upon said reinforced edge portion of said sheet, said reinforcing elements having portions extending completely through said sheet.

4. A sheet of tough pliable material such as rubber, to be hung over a door opening of a doghouse or the like, means for suspending same from its upper edge, said sheet having a pair of flaps, said flaps being disconnected from each other throughout their length and freely movable relative to each other due to said sheet having a substantially central vertical slit extending from its lower end to a point at the top of said flaps and which is near but short of the upper end of said sheets, and a multiplicity of separate, individual, substantially rigid, small, exposed, reinforcing elements secured to said sheet and spaced apart from each other along said vertical edge of said flaps adjacent to the slit separating said flaps as well as along the lower edges of said flaps, said reinforcing elements being of rigid but sufficiently soft material to normally prevent injury to a dog's teeth if he chews upon said reinforced portion of said flaps, said reinforcing elements being of moderately soft but substantially rigid non-ferrous metal.

5. A doghouse door in the form of a sheet of tough pliable material, such as rubber, to be hung over a door opening, said sheet having a substantially central vertical slit which extends from its lower end to a point near its upper end forming a pair of independent and freely movable flaps, means for supporting said sheet solely from its upper edge, and a multiplicity of separate, individual, substantially rigid, small, exposed, reinforcing elements secured to said sheet and spaced apart from each other along said slit and bottom edges thereof, said reinforcing elements being of sufficiently soft material to normally prevent injury to a dog's teeth if he chews upon said reinforced edge portions of said sheet, and comprises soft non-ferrous metal rivets.

6. A doghouse door in the form of a sheet of tough pliable material to be hung over a door opening, said sheet having a substantially central vertical slit extending from its lower end to a point near its upper end forming a pair of independent and freely movable flaps, means for supporting said sheet solely from its upper edge, and a multiplicity of separate, individual, substantially rigid, small, exposed, reinforcing elements secured to said flaps and spaced apart from each other along the side of said slit and bottom edges thereof, said reinforcing elements being of sufficiently soft material to normally prevent injury to a dog's teeth if he chews upon said reinforced edges of said flaps, said reinforcing elements being in the form of rigid but soft non-ferrous rivets and rigid but soft non-ferrous washer plates which are secured to said flaps by at least some of said rivets.

7. A doghouse door in the form of a sheet of tough pliable material to be hung over a door opening, means for supporting said sheet solely from its upper edge, said sheet having a pair of flaps, said flaps being disconnected from each other throughout their length and freely movable relative to each other due to said sheet having a substantially central vertical slit extending from its lower end to a point at the top of said flaps and which is near but short of the upper end of said sheet, and a multiplicity of separate, individual, substantially rigid, small, exposed, reinforcing elements secured to said flaps and spaced apart from each other along the edges of said flaps adjacent said slit as well as along the lower end of said flaps, said reinforcing elements being of rigid but yet sufficiently soft material to normally prevent injury to a dog's teeth if he chews upon the reinforced portion of said flaps, said reinforcing elements being in the form of rigid but soft non-ferrous rivets and rigid but soft non-ferrous washer plates which are secured to said flaps by some of said rivets, said washer plates being disposed in the corners of said flaps at the lower edge of same adjacent said slit.

8. A doghouse door in the form of a sheet of tough pliable material to be hung over a door opening, said sheet having a substantially central vertical slit from its lower end to a point near its upper end forming a pair of independent and freely movable flaps, means for supporting said sheet solely from its upper edge, a multiplicity of separate, individual, substantially rigid, small, exposed, reinforcing elements secured to said flaps and spaced apart from each other adjacent said slit and bottom edges thereof, said reinforcing elements being of rigid but sufficiently soft material to normally prevent injury to a dog's teeth if he chews upon said reinforced edges of said flaps, said reinforcing elements consisting of soft non-ferrous metal stitches extending through said flaps.

9. A doghouse door in the form of a sheet of tough pliable material to be hung over a door opening, said sheet having a substantially central vertical slit from its lower end to a point near its upper end forming a pair of independent and freely movable flaps, means for supporting said sheet solely from its upper edge, a multiplicity of separate, individual, substantially rigid, small, exposed, reinforcing elements secured to said flaps and spaced apart from each other adjacent said slit and bottom edges thereof, said reinforcing elements being of rigid but sufficiently soft material to normally prevent injury to a dog's teeth if he chews upon said reinforced edges of said flaps, said reinforcing elements comprising rigid but soft non-ferrous U-shaped metal clips which straddle said edges of said flaps.

10. A doghouse door in the form of a sheet of tough pliable material to be hung over a door opening, said sheet having a substantially central vertical slit from its lower end to a point near but short of its upper end forming a pair of independent and freely movable flaps, means for supporting said sheet solely from its upper end, and a multiplicity of separate, independent, substantially rigid, small, exposed, reinforcing elements secured to said flaps and spaced apart from each other along edges thereof, said reinforcing elements being of rigid but sufficiently soft material to normally prevent injury to a dog's teeth if he chews upon said reinforced edges of said flaps, said reinforcing elements comprising rigid but soft non-ferrous U-shaped metal clips which straddle said edges of said flaps at the bottom thereof, as well as along said slit, and rigid but soft non-ferrous rivets passing through the side arms of said clips and through the intervening portions of said sheet.

References Cited in the file of this patent
UNITED STATES PATENTS

| 1,119,860 | Nelson | Dec. 8, 1914 |
| 2,122,532 | Mims et al. | July 5, 1938 |
| 2,560,661 | Poovey | July 17, 1951 |
| 2,595,833 | Flaherty | May 6, 1952 |
| 2,708,927 | Dixon et al. | May 24, 1955 |
| 2,758,646 | Johnson | Aug. 14, 1956 |
| 2,785,409 | Lackey | Mar. 19, 1957 |

OTHER REFERENCES

Popular Science, December 1955, page 198, vol. 167, No. 6.

Popular Mechanics, March 1956, page 121.